US006482463B1

(12) United States Patent
Mologni et al.

(10) Patent No.: US 6,482,463 B1
(45) Date of Patent: Nov. 19, 2002

(54) METHOD OF PREPARING DRY ANIMAL FEED

(75) Inventors: Battista Mologni, Albano Sant' Alessandro (IT); Inger Olausson, Kållekärr (SE); Anne-Cathrine Samuelsson, Lilla Edet (SE)

(73) Assignee: Akzo Nobel Surface Chemistry AB, Stenungsund (SE)

( * ) Notice: Subject to any disclaimer, the term of this patent is extended or adjusted under 35 U.S.C. 154(b) by 0 days.

(21) Appl. No.: 09/715,722

(22) Filed: Nov. 17, 2000

Related U.S. Application Data

(63) Continuation of application No. PCT/SE99/00752, filed on May 5, 1999.

(30) Foreign Application Priority Data

May 26, 1998 (SE) ............................................ 9801844-3

(51) Int. Cl.⁷ ................................................. A23K 1/00
(52) U.S. Cl. ........................ 426/623; 426/635; 426/807
(58) Field of Search ................................ 426/623, 635, 426/807

(56) References Cited

U.S. PATENT DOCUMENTS

| | | | | |
|---|---|---|---|---|
| 3,993,796 A | * | 11/1976 | Steinke ....................... 426/630 |
| 4,143,169 A | | 3/1979 | Skoch et al. ................. 426/307 |
| 4,153,735 A | * | 5/1979 | Mommer ..................... 426/285 |
| 4,167,584 A | | 9/1979 | Nelson ............................ 426/2 |
| 4,216,234 A | * | 8/1980 | Rawlings et al. ............... 426/2 |
| 4,798,737 A | * | 1/1989 | Brunton et al. ............. 426/602 |
| 5,211,980 A | * | 5/1993 | Cox ............................ 426/601 |
| 5,393,535 A | * | 2/1995 | Kjems ........................ 424/678 |
| 5,928,687 A | * | 7/1999 | Meade ........................... 426/2 |

FOREIGN PATENT DOCUMENTS

| | | | | |
|---|---|---|---|---|
| DE | 153062 | * | 12/1981 | |
| EP | 0 165 663 | | 12/1985 | ............ A23K/1/00 |
| GB | 2031937 | * | 4/1980 | |
| GB | 2082038 | * | 3/1982 | |
| WO | 99/60865 | * | 12/1999 | |

* cited by examiner

*Primary Examiner*—Chhaya D. Sayala
(74) *Attorney, Agent, or Firm*—Ralph J. Mancini

(57) ABSTRACT

The present invention relates to a method of preparing a ground dry animal feed with a predetermined water content. According to the method, there is added to a dry animal feed mixture an emulsion of water emulsified in a hydrophobic component having a melting point of at least 15° C., suitably at least 20° C., in such an amount that the animal feed obtains the predetermined water content.

17 Claims, No Drawings

METHOD OF PREPARING DRY ANIMAL FEED

This is a continuation of International Application No. PCT/SE99/00752 which was filed on May 5, 1999 and claims priority of Swedish Patent Application No. 9801844-3 filed on May 26, 1998.

FIELD OF THE INVENTION

The present invention relates to a method of preparing a dry animal feed with a predetermined water content. According to the method, there is added to a dry animal feed mixture an emulsion of water emulsified in a hydrophobic component with a melting point of at least 15° C., suitably at least 20° C., in such an amount that the animal feed obtains the predetermined water content.

BACKGROUND OF THE INVENTION

In the breeding of animals, it is of economic importance that the animals obtain feed which does not only contain correctly adapted nutritive substances but is also given in correct amounts, thereby maximising the growth per kilogram of consumed feed. However, it has been found difficult in the administration of dry animal feed to calculate the active content in the animal feed owing to a varying water content. Variations in the water content of more than 2% from the desired value are not unusual. When breeding mink and fox it is also important that the dry animal feed mixtures contain a considerable amount of water, thereby reducing the risk of dehydration in cold weather. There are several reasons why the water content in dry animal feed varies. One reason is that the water contents in the ingredients included, for instance corn, vary from time to time. Another reason is that when grinding the ingredients included, when mixing the various ingredients and in optional pelletizing, extrusion and/or expansion, heat is supplied, which results in evaporation of water. Also in storage, considerable amounts of water may evaporate.

It has also been found that direct addition of water to the animal feed mixture in many cases causes difficult problems, such as caking, above all of pulverulent animal feed, and mould. The object of the present invention therefore is to provide a method of preparing a dry pulverulent animal feed with small or insignificant variations in the water content, while at the same time caking of the animal feed and mould are reduced or prevented.

SUMMARY OF THE INVENTION

The present invention generally relates to a method of preparing a ground dry animal feed with a predetermined increased water content. The present method comprises adding to the animal feed an emulsion containing water emulsified in a liquid hydrophobic component comprising a lipid, a fatty acid or a mixture thereof and having a melting point of at least 15° C., measured according to ASTM 15-04 No. D5440, in such an amount that the prepared animal feed obtains the predetermined water content, mixing the emulsion with the animal feed, and, if necessary, cooling the prepared animal feed to a temperature below the melting point of the hydrophobic component.

DETAILED DESCRIPTION OF THE INVENTION

It has now surprisingly been found that a ground dry animal feed with a predetermined increased water content can be prepared by the steps of adding to the animal feed an emulsion containing water emulsified in a liquid hydrophobic component, comprising a lipid, a fatty acid or a mixture thereof and having a melting point of at least 15° C., suitably at least 20° C., measured according to ASTM 15-04 No. D5440, in such an amount that the prepared animal feed obtains the predetermined water content, mixing the emulsion with the animal feed, and, if necessary, cooling the prepared animal feed to a temperature below the melting point of the hydrophobic component. The inventive method results in a dry animal feed, whose water content varies to a smaller extent than an animal feed prepared in a conventional manner. According to the method, the animal feed mixture is also hydrophobated, which results in reduced tendency to form lumps or to mould. The inventive method can be applied to all types of dry animal feed mixtures, such as fine-grained, pelletized, extruded or expanded dry animal feed mixtures. The amount of the hydrophobic component suitably is 1–8 parts by weight per part by weight of water. To obtain a stable emulsion, also an emulsifier is usually added in an amount of 0.005–0.05 parts by weight per part by weight of hydrophobic component.

The emulsion can be added at any time after grinding of the components included, either to a ground component or to the dry animal feed mixture before pelletizing, extruding or expanding, or after pelletizing, extruding or expanding, or by a combination of the stated points of addition.

In the preparation of a conventional dry animal feed, 0.5–4% by weight of water, based on the final weight of the dry animal feed, is normally lost. In the method according to the invention, 1–10% by weight, based on the final weight of the dry animal feed, of an emulsion is usually added in order to at least partly compensate for the amount of water lost in the preparation of animal feed. The ratio of water to hydrophobic component varies according to the solidifying point of the component. The higher solidifying point the more water can be used in relation to the hydrophobic component. The weight ratio of water to hydrophobic component preferably is 1:1–1:2 and the amount of water in the emulsion is 1–4%, based on the final weight of the dry animal feed. The emulsifier content based on the amount of hydrophobic component preferably is between 1 and 4% by weight. Even if hydrophobic components with a melting point of 15° C. can be used, hydrophobic components with a melting point of 30° C. min are preferred. Examples of suitable hydrophobic components are fats, such as lard, tallow, chicken grease, bone grease, slaughtering grease, cured vegetable oils and cured fish oil; fatty acids and distillation residues of fatty acids containing mono-, di- or triglycerides. Normally the melting point is lower than 90° C.

The emulsifiers are conventional emulsifiers for hydrophobic, water-soluble products. In the first place, use is made of nonionic surfactants, which contain an aliphatic hydrocarbon group having 8–24 carbon atoms, preferably 12–22 carbon atoms. The nonionic surfactants suitably consist of nonionic polyethylene glycols, such as ethoxylate of carboxylic acids, ethoxylate of mono-, di- or triglycerides, ethoxylate of mono-, di- or triesters of sorbitan or ethoxylate of fatty alcohols. Other suitable nonionic surfactants are mono-, di- or triglycerides based on fatty acids having 12–22 carbon atoms, or mono-, di- or triesters of sorbitan based on fatty acids having 12–22 carbon atoms. Of the described nonionic surfactants, those having an HLB value of 2–12, preferably 2–9, and most preferred 3–7 are particularly suitable. The stated HLB values are determined in consideration of the weight percentage of hydrophilic groups according to the equation $$HLB = W_A + W_E/5$$

wherein $W_A$ is the weight percentage of polyalcohol, such as glycerol o r sorbitol, in % of the weight of the surfactant and $W_E$ is the weight percentage of polyethylene oxide in % of the weight of the surfactant.

Especially preferred nonionic surfactants are castor oil ethoxylate, ethoxylated sorbitan oleate and sorbitan esters.

In addition to nonionic surfactants containing an aliphatic hydrocarbon group having 8–24 carbon atoms, also phosphatides, such as lecithin and cephalin, have excellent properties. Preferred phosphatides are lecithin and acetylated lecithin.

The preparation of dry animal feed begins by grounding many of the raw products, such as cereals. This causes losses of water. Then the dry ingredients are mixed. Some lipids, suitably in liquid phase, and fatty acids can also be added and admixed to the dry animal feed. Then there are a few different modes of treatment. For instance, the mixed dry animal feed can be packaged directly. Another possibility is thermal treatment of the dry animal feed in a pelletizing machine at 55–90° C., in an expander at 90–120° C. or in an extruder at 130–160° C. or by a combination of these thermal treatments before packaging. Water evaporates in the treatments at elevated temperatures. The higher treatment temperature and the longer treatment time, the more water evaporates.

According to the invention, water and an emulsifier can be added to the emulsion in one or more steps to increase the water content of the dry animal feed to the desired level. The addition can be made a) to one of the ground components or to the dry animal feed before a possible treatment at an increased temperature, b) after one or more treatments of the animal feed at an increased temperature, or c) by a combination of the points of addition according to a) and b).

After adding, the emulsion is mixed in the animal feed, and if the hydrophobic component has a low melting point, the animal feed mixture is cooled to a temperature below the melting point of the hydrophobic component. With a view to obtaining a granule-like powder of good quality and stability, it is suitable to pelletize the animal feed in a finalising treatment at an increased temperature. The pelletizing operation can possibly be followed by crushing of the pellets to the desired particle size.

The present invention is further illustrated by the following nonlimiting Examples.

EXAMPLE 1

The capability of different emulsifiers of enclosing water in lard having a melting point of 36° C. was measured according to the following method. 20 g lard heated to a temperature of 45° C. was mixed with 1 g of one of the emulsifiers below, whereupon 10 g of 10° C. water were added successively during stirring. When the mixture had solidified, the samples were allowed to stand at 20° C. for 4 h. Then the solidified mixture was decomposed and free water was poured out and weighed. The following results were obtained.

TABLE 1

| Emulsifier | % by weight bound water |
|---|---|
| Castor oil ethoxylate (4 EO) | 100 |
| Castor oil ethoxylate (8 EO) | 100 |
| Sorbitan monooleate | 100 |
| Tallow ethoxylate (8 EO) | 94 |
| Diester of lauric acid and polyethylene glycol (molecular weight 600) | 91 |
| Lecithin, animal feed quality | 100 |

As appears from the results, all tested emulsifiers had a very good capability of enclosing water.

EXAMPLE 2

A basic formulation of a dry animal feed was prepared by mixing the following ingredients.

TABLE 2

| Basic formulation Ingredients | Parts by weight |
|---|---|
| Ground rye | 21 |
| Ground wheat | 16 |
| Potato flour | 13 |
| Soybean extract (44% by weight protein) | 9 |
| Peas | 9 |
| Wheat starch | 5 |
| Sunflower oil | 5 |
| Meat meal | 5 |
| Molasses | 4 |
| Premix | 8 |

To the basic formulation having a water content of 12.0% by weight, 3.15 parts by weight of an emulsion were added, which consisted of 2 parts by weight of lard having a melting point of 30° C., 1 part by weight of water and 0.1 parts by weight of castor oil ethoxylate, which had been obtained by adding 15 moles of ethylene oxide to 1 mole of castor oil. Owing to this addition, the animal feed was estimated, after vapour treatment and pelletizing, to obtain a water content of about 12% by weight. For comparison, a check formulation was prepared, which in addition to the basic formulation also contained 1.1 parts by weight of ground rye and 2 parts by weight of lard having a melting point of 30° C.

The two animal feed mixtures were treated with vapour and then supplied directly to a pelletizing machine, in which the animal feed was pelletized under pressure at 70° C. The obtained pellet product was cooled and crushed to a coarse powder.

The obtained animal feed mixtures and the various intermediate products were analysed in respect of water content according to Karl Fischer. The following results were obtained.

TABLE 3

| | Weight %, water content | |
|---|---|---|
| Product | Invention | Check |
| Animal feed before vapour treatment | 12.4 | 11.7 |
| Animal feed after vapour treatment | 13.8 | 12.9 |

TABLE 3-continued

| Product | Weight %, water content | |
|---|---|---|
| | Invention | Check |
| Animal feed after pelletizing and cooling | 12.3 | 11.6 |
| Animal feed after crushing | 12.1 | 11.2 |

As appears from the results, the water content of the animal feed according to the invention reached the desired level, whereas the water content of the check formulation was about 1% by weight lower.

EXAMPLE 3

The purpose of this Example is to prepare an expanded and pelletized animal feed having a water content of about 12.0% by weight.

To the basic formulation in Example 1, 5.85 parts by weight of an emulsion were added, which consisted of 3.8 parts by weight of lard having a melting point of 30° C., 1.9 parts by weight of water and 0.15 parts by weight of the same castor oil ethoxylate as in Example 1.

For comparison, a check formulation was prepared, which in addition to the basic formulation also contained 3.8 parts by weight of lard having a melting point 30° C. and 2.05 parts by weight of ground rye.

The two animal feed formulations were then subjected to a combined expanding and pelletizing process. The animal feed formulations were treated with vapour and then introduced into an expander at 95° C. under excess pressure, whereupon the animal feed mixtures were subjected to pressure release to atmospheric pressure. After the expansion, the animal feed was crushed to a fine powder which was immediately pelletized at 70° C. The pelletized products were cooled and crushed to smaller particles. The final products, the animal feed formulation and the various intermediate products were analysed according to Karl Fischer in respect of water content. The following results were obtained.

TABLE 4

| Product | Water content, weight % | |
|---|---|---|
| | Invention | Check |
| Animal feed before vapour treatment | 13.2 | 11.6 |
| After expanding | 14.9 | 13.0 |
| After pelletizing and cooling | 12.2 | 11.1 |
| Final product | 12.0 | 10.9 |

The results show a water content of 12.0% by weight for the animal feed according to the invention, which is about 1% by weight higher than for the check formulation.

We claim:

1. A method of preparing a ground, dry animal feed with a predetermined increased water content which comprises grinding at least one animal feed raw material in order to obtain a ground animal feed, and subjecting said ground animal feed to at least one thermal treating step in order to obtain a dry, ground animal feed, wherein an emulsion is added to said ground, dry animal feed in an amount sufficient to impart a predetermined water content to said feed, wherein said emulsion comprises water emulsified in a liquid hydrophobic component, wherein said liquid hydrophobic component comprises a lipid, a fatty acid or a mixture thereof, and has a melting point of at least 15° C.

2. The method of claim 1 which further comprises cooling the ground, dry animal feed with a predetermined increased water content to a temperature below the melting point of the hydrophobic component.

3. The method of claim 1 wherein the emulsion is added
   a) to said at least one animal feed raw material prior to grinding; or
   b) to said ground animal feed prior to thermal treatment; or
   c) to the ground, dry animal feed subsequent to said thermal treatment, or
   d) by a combination of a), and/or b), and/or c),
wherein the hydrophobic component has a melting point of at least 20° C.

4. The method of claim 3 wherein said animal feed is subjected to pelletizing at an increased temperature as a last treatment.

5. The method of claim 1 wherein the hydrophobic component has a melting point of at least 30° C.

6. The method of claim 1 wherein said water is emulsified in said hydrophobic component by means of an emulsifier selected from the group consisting essentially of a nonionic surfactant containing an aliphatic hydrocarbon group having 8–24 carbon atoms, a phosphatide containing an aliphatic hydrocarbon group having 8–24 carbon atoms and mixtures thereof.

7. The method of claim 6 wherein the nonionic surfactant has an HLB value of 2–12.

8. The method of claim 7 wherein the nonionic surfactant has an HLB value of 2–9.

9. The method of claim 1 wherein said emulsion is added to said animal feed in an amount of 1–10% by weight based on the final weight of the dry animal feed.

10. The method of claim 9 wherein the emulsion contains 1–8 parts by weight of the hydrophobic component per part by weight of water, and 0.005–0.05 parts by weight of an emulsifier per part by weight of the hydrophobic component.

11. Animal feed having a predetermined increased water content, wherein said animal feed comprises an emulsion added thereto in an amount sufficient to impart said predetermined water content to said feed, wherein said emulsion comprises water emulsified in a liquid hydrophobic component, wherein said liquid hydrophobic component comprises a lipid, a fatty acid or a mixture thereof, and has a melting point of at least 15° C.

12. Animal feed of claim 11 wherein the hydrophobic component has a melting point of at least 30° C.

13. Animal feed of claim 11 wherein said water is emulsified in said hydrophobic component by means of an emulsifier selected from the group consisting essentially of a nonionic surfactant containing an aliphatic hydrocarbon group having 8–24 carbon atoms, a phosphatide containing an aliphatic hydrocarbon group having 8–24 carbon atoms and mixtures thereof.

14. Animal feed of claim 13 wherein the nonionic surfactant has an HLB value of 2–12.

15. Animal feed of claim 14 wherein the nonionic surfactant has an HLB value of 2–9.

16. Animal feed of claim 11 which comprises 1–10% by weight based on the final weight of the dry animal feed of said emulsion.

17. Animal feed in accordance with claim 16 wherein the emulsion contains 1–8 parts by weight of the hydrophobic component per part by weight of water, and 0.005–0.05 parts by weight of an emulsifier per part by weight of the hydrophobic component.

* * * * *